United States Patent
Durham et al.

(10) Patent No.: US 10,288,144 B2
(45) Date of Patent: May 14, 2019

(54) TRANSMISSION TORQUE CONVERTER DEVICE

(71) Applicant: VALEO EMBRAYAGES, Amiens (FR)

(72) Inventors: Patrick Durham, Troy, MI (US); Daniel Fenioux, Saleux (FR)

(73) Assignee: Valeo Embrayages, Amiens (FR)

( * ) Notice: Subject to any disclaimer, the term of this patent is extended or adjusted under 35 U.S.C. 154(b) by 598 days.

(21) Appl. No.: 15/041,215

(22) Filed: Feb. 11, 2016

(65) Prior Publication Data

US 2017/0234399 A1    Aug. 17, 2017

(51) Int. Cl.
*F16H 45/02* (2006.01)
*F16F 15/121* (2006.01)
*F16F 15/133* (2006.01)

(52) U.S. Cl.
CPC ...... *F16F 15/1215* (2013.01); *F16F 15/1333* (2013.01); *F16F 15/1336* (2013.01); *F16H 45/02* (2013.01); *F16F 2230/0064* (2013.01); *F16H 2045/0205* (2013.01); *F16H 2045/0221* (2013.01); *F16H 2045/0278* (2013.01)

(58) Field of Classification Search
CPC ............... F16F 15/1215; F16F 15/1333; F16F 15/1336; F16F 2230/0064; F16F 2232/02; F16F 2226/04; F16H 45/02; F16H 2045/0278; F16H 2045/0205; F16H 2045/0221; F16H 41/24; F16H 2045/0294; F16D 13/40; F16D 2300/22

See application file for complete search history.

(56) References Cited

U.S. PATENT DOCUMENTS

| | | | |
|---|---|---|---|
| 2,551,718 | A | 5/1951 | Auten |
| 4,145,936 | A | 3/1979 | Vincent et al. |
| 4,703,840 | A | 11/1987 | Bopp |
| 5,697,261 | A | 12/1997 | Mokdad et al. |
| 5,823,880 | A | 10/1998 | Kajitani et al. |
| 5,893,355 | A | 4/1999 | Glover et al. |
| 2003/0106763 | A1 | 6/2003 | Kimura et al. |
| 2015/0369296 | A1 | 12/2015 | Lopez-Perez |

(Continued)

FOREIGN PATENT DOCUMENTS

| | | |
|---|---|---|
| DE | 19729421 | 1/1998 |
| DE | 19919449 | 11/1999 |
| DE | 102004024747 | 12/2005 |

(Continued)

OTHER PUBLICATIONS

Interanational Search Report from corresponding international application No. PCT/EP2017/052362.

*Primary Examiner* — David J Hlavka
(74) *Attorney, Agent, or Firm* — Berenato & White, LLC (57) ABSTRACT

A torque transmitting device comprising a torque input element (17*a*, 17*b*) and a torque output element (8) able to pivot about an axis (X) with respect to one another, at least one elastic leaf (22), rotationally coupled to the torque output element (8) or to the torque input element (17*a*, 17*b*) respectively, the elastic leaf (22) being able to be elastically and radially held torest on a supporting member (18) carried by the torque input element (17*a*, 17*b*) or the torque output element (8) respectively, the elastic leaf (22) being able to bend upon rotation of the torque input element (17*a*, 17*b*) with respect to the torque input element (8).

20 Claims, 9 Drawing Sheets

(56) References Cited

U.S. PATENT DOCUMENTS

2017/0097075 A1* 4/2017 Depraete ................. F16H 45/02
2017/0363194 A1* 12/2017 Durham ................. F16H 45/02

FOREIGN PATENT DOCUMENTS

| | | |
|---|---|---|
| EP | 1048420 | 11/2000 |
| FR | 2339107 | 8/1977 |
| FR | 2493446 | 5/1982 |
| FR | 2499182 | 8/1982 |
| FR | 2628804 | 9/1989 |
| FR | 2714435 | 6/1995 |
| FR | 2828543 | 2/2003 |
| FR | 2938030 | 5/2010 |
| FR | 3000155 | 6/2014 |
| GB | 1212042 | 11/1970 |
| GB | 2235749 | 3/1991 |
| GB | 2262795 | 6/1993 |
| GB | 2283558 | 5/1995 |
| GB | 2284875 | 6/1995 |
| GB | 2468030 | 8/2010 |
| JP | 09280317 | 10/1997 |
| JP | 2000192992 A | 7/2000 |
| WO | WO9914114 | 3/1999 |
| WO | WO2004016968 | 2/2004 |
| WO | WO2011006264 | 1/2011 |
| WO | WO2014128380 | 8/2014 |
| WO | WO2016020584 A1 | 2/2016 |
| WO | WO2016146415 A1 | 9/2016 |

* cited by examiner

TRANSMISSION TORQUE CONVERTER DEVICE

FIELD OF THE INVENTION

The present invention relates to a torque transmitting device and a hydrokinetic torque coupling device for a motor vehicle, such as a torque converter, as well as a dual flywheel, for instance.

BACKGROUND OF THE INVENTION

Figure 1:
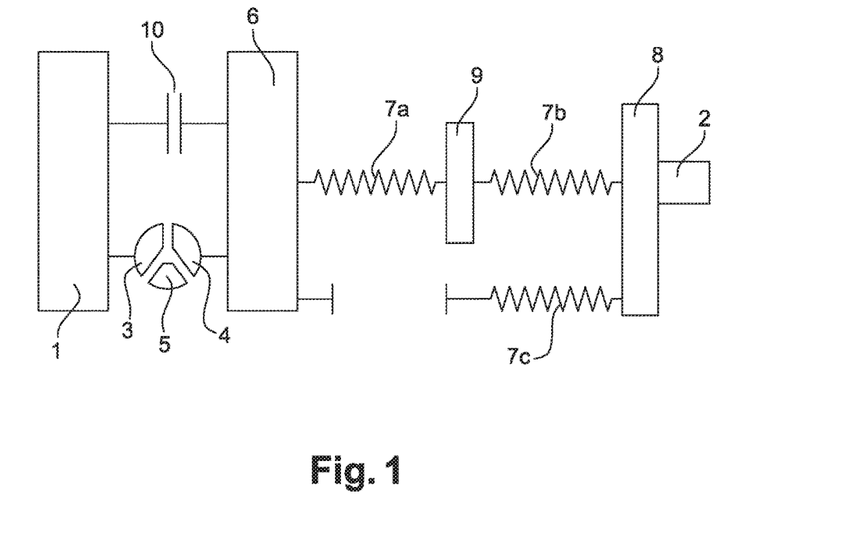
FIG. 1 is a schematic representation of a torque converter of the prior art.

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 is coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or the angular shift noted α, of the guiding washers 6 relative to the hub 8, is defined relative to a rest position (α=0) wherein no torque is transmitted through damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant a angular offset of the guiding washers 6 relative to the hub 8 (or vice versa).

It can be seen that the representation of function M=f(α) which defines the M torque transmitted though the device according to the a angular shift, comprises a first linear portion of slope Ka (for the low values of the α angular shift) and a second, more important, linear portion of slope Kb (for the high value of the α angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then Ka=(K1·K2)/(K1+K2) and Kb=Ka+K3.

The break of slope between the first and second portions of the curve may generate vibrations and a significant hysteresis upon operation of the torque converter which might affect the quality of filtration obtained using the damping means.

SUMMARY OF THE INVENTION

The invention more particularly aims at providing a simple, efficient and cost-effective solution to this problem.

For this purpose, it provides a torque transmitting device comprising a torque input element and a torque output element able to pivot about an axis with respect to one another, at least one elastic leaf, rotationally coupled to the torque output element or to the torque input element respectively, with the elastic leaf being able to be elastically and radially held by a supporting member carried by the torque input element or the torque output element respectively, with the elastic leaf being able to bend upon rotation of the torque input element with respect to the torque output element, characterized in that the elastic leaf comprises at least two stacked elastic blades, with the two blades and the supporting member being so configured that the supporting member is able to rest on only one of the two blades, on a first angular travel of the torque input element with respect to the torque output element, with said supporting member being able to simultaneously rest on both blades on a second angular travel of the torque input element with respect to the torque output element.

Such transmitting device thus provides damping means having a characteristic gradual curve, without any break of slope. The invention thus makes it possible to reduce the vibrations generated in operation and provides a high quality of filtration.

The shift between the resting position of the supporting member on one of the blades, and then on both blades makes it possible to vary the stiffness of the damping means according to the travel of the torque input element with respect to the torque output element. Such stiffness can thus be low at the beginning of the travel and increase at the end of the travel. As a matter of fact, the stiffness constant of such damping means is low when the supporting member is resting on only one of the elastic blades, with such stiffness constant increasing when the supporting member is simultaneously resting on both elastic blades.

Eventually, making the elastic leaf from a stack of several blades facilitates the production of said leaf. As a matter of fact, the blades can be easily produced by cutting sheets of metal.

It should be noted that the words "radial" and "axial" are defined with respect to the axis of the transmitting device, which is specifically the axis of rotation of the torque input element with respect to the torque output element.

On the other hand, the leaf is so arranged as to enable the blades to bend independently from each other.

The cam profiles are adapted to reach the desired stiffness, and the engaging sections thereof are adapted to comply with the desired constraints.

The multilayer leaf is composed of an odd number of blades, preferably 3, with the same n number of blades with a certain stiffness and the same n−1 number of blades with a different stiffness.

The elastic leaf comprises at least three stacked elastic blades, the three blades and the supporting member being so configured that said supporting member is able to rest on only one of said three blades during a first angular travel of the torque input element with respect to the torque output element, with said supporting member being able to simultaneously rest on only two blades during a second angular travel of the torque input element with respect to the torque output element, with said supporting member being able to simultaneously rest on three blades during a third angular travel of the torque input element with respect to the torque output element. The interest of having three blades lies in obtaining a force generated by the blades in the median plane of the supporting member (or roller)(no tilting torque).

Each blade comprises an area for the connection with the torque output element 8, respectively to the torque input element, and an area for bearing on the supporting member, with the resting area of each blade comprising at least a radially shifted portion of the corresponding portion of the resting area of the other blade.

The supporting member may be cylindrical and extend parallel to the shaft of the torque transmitting device. The radial shifting between the various portions of the resting areas of the blades enables the supporting member to rest on only one of the blades during the first angular travel, on two blades during the second travel, and on the three blades during the third travel.

At least two blades may have a different stiffness.

In this case, at least one blade may have a thickness, i.e. an axial dimension different from that of the other blade.

Or at least one blade may have a width, i.e. a dimension measured along a line perpendicular to an expansion line of the blade, different from that of the other blade. In one example, the width of one blade may be larger than that of the other blade, with a view to increasing the stiffness of this blade.

The blade has a free distal end and a proximal end connected to the torque input element, respectively the torque output element through a linking element. In one example, the width of the blade is modified in a place distant from the free distal end thereof, and close to the place of connection with the torque input element, respectively the torque output element.

Besides, each blade may comprise an area for the connection with the torque output element, respectively with the torque input element, and an area for bearing the supporting member, with the linking area and the resting area being linked together by a curved area, with the curved areas of at least two blades being shifted with respect to one another on the circumference.

The curved areas may have different shapes and/or different radiuses of curvature.

The blades linking areas may be annular and comprise radially internal ribs, able to cooperate with ribs on the torque output element, respectively the torque input element.

The supporting member may comprise a rolling body so mounted as to pivot about a shaft, with said shaft being attached to the torque input element, respectively the torque output element.

In such case, the rolling body of the supporting member may consist of a roller so mounted as to pivot about a shaft, for instance through a rolling bearing, such as a needle bearing, for instance.

The elastic leaf may be so designed that, in a relative angular position between the torque input element and the torque output element different from a rest position, the supporting member exerts a bending stress on the elastic leaf causing a cross reaction force of the elastic leaf on the supporting member, with such reaction force having a circumferential component which tends to move back the torque input element and the torque output element toward said relative rest position.

The elastic leaf may be so designed that, in a relative angular position between the torque input element and the torque output element different from a rest position, the supporting member exerts a bending stress on the elastic leaf causing a cross reaction force of the elastic leaf on the supporting member, with such reaction force having a radial component which tends to hold the elastic leaf in contact with the supporting member.

The angular displacement of the torque input element relative to the torque output element may be greater than 20° and preferably greater than 40°.

The damping means may comprise at least two elastic leaves, with each elastic leaf rotating together with the torque output element, or the torque input element respectively, with each leaf being associated with a supporting element rotationally linked with the torque input element, or the torque output element respectively, with each leaf being elastically maintained supported by said matching supporting element, with each elastic leaf being adapted to bend upon rotation of the torque input element relative to the torque output element.

The invention also provides for a hydrokinetic torque coupling device for a motor vehicle, comprising
    an impeller wheel intended to be coupled to a crankshaft,
    a turbine wheel able to be hydrokinetically rotated by the impeller wheel, and able to be rotationally coupled to a transmission input shaft,
    clutch means,
    a torque transmitting device of the type mentioned above, with the torque input element being linked to or consisting of the clutch means, with the torque output element being linked to or consisting of a hub intended to be rotationally coupled to the transmission input shaft,
    the clutch means being movable between an engaged position in which the impeller wheel and the torque input element of the torque transmitting device are rotationally coupled and a disengaged position in which the impeller wheel and said torque input element are rotationally uncoupled.

Besides, such a hydrokinetic torque coupling device is easy to mount and rather inexpensive.

The hub may be rotationally coupled to the turbine wheel.

The clutch means may comprise a piston.

It should be noted that a hydrokinetic torque coupling device may be a torque converter when the hydrokinetic torque coupling means comprise an impeller wheel, a turbine wheel and a reactor, or may be a coupler when the hydrokinetic torque coupling means have no reactor.

The impeller wheel is rotationally coupled to the torque input element and able to hydrokinetically drive a turbine wheel, through a reactor.

The hydrokinetic torque coupling device may also comprise one or more of the following characteristics:
    the supporting member is mounted on the radially external periphery of at least one flange belonging to the torque input element,
    said flange is rotationally coupled to the piston, for instance at the radially external periphery of the flange,
    the flange is so mounted as to pivot about the torque output element,
    the supporting member is axially mounted between two flanges which radially extend and are axially shifted with respect to one another,
    the impeller wheel is rotationally coupled to a cover wherein the impeller wheel, the turbine wheel and/or the torque transmitting device are at least partially accommodated.

the torque output element comprises a hub intended to be rotationally coupled to a transmission input shaft,

BRIEF DESCRIPTION OF THE DRAWINGS

The invention also relates to a dual flywheel comprising a torque transmitting device of the type mentioned above. The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

A hydrokinetic torque coupling device according to a first embodiment of the invention is shown in FIGS. 2 to 5. The hydrokinetic torque coupling device is more particularly a hydrodynamic torque converter. Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

Figure 2:
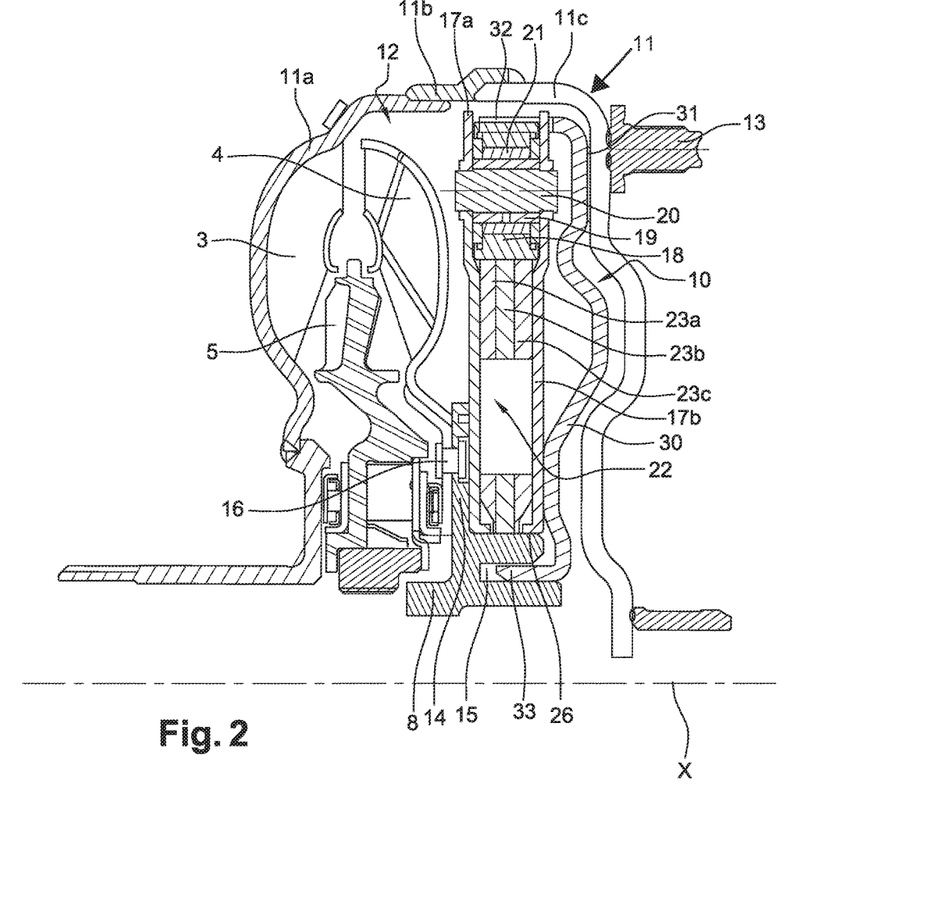
FIG. 2 is a half-sectional view along an axial plane, of a torque converter according to the invention.

The torque converter conventionally comprises an impeller bladed wheel 3, able to hydrokinetically drive a turbine bladed wheel 4 through a reactor 5.

The impeller wheel 3 is fastened to a cover consisting of several parts 11a, 11b, 11c assembled together by welding and defining an internal volume 12 accommodating the impeller wheel 3, the turbine wheel 4 and the reactor 5. Said cover 11a, 11b, 11c, also more generally referred to as cover 11, comprises fastening means 13 making it possible to rotationally couple said cover 11 with the crankshaft 1.

The torque converter further comprises a central hub 8, the radially internal periphery of which is ribbed, with an X axis and accommodated in the internal volume 12 of the cover 11. The central hub 8 comprises an annular rim 14 which radially extends outwards and an annular groove 15 which axially opens opposite the impeller wheel 3 and the turbine wheel 4.

The turbine wheel 4 is fastened to the first annular rim 14 of the central hub 8, for instance by rivets 16 or by welding.

The torque converter further comprises two radial flanges 17a, 17b, axially shifted with respect to one another. The flanges 17a, 17b are so mounted as to pivot about the hub 8.

Two supporting members or rolling bodies 18 shaped as rollers or cylindrical rollers, are fixed on the radially external periphery of the flanges 17a, 17b, axially between the flanges 17a, 17b. The rolling bodies 18 are positioned so as to be diametrically opposed. More specifically, the rolling bodies 18 are mounted about axes 19 which axially extend between the flanges 17a, 17b and rotationally couple said flanges 17a, 17b. The axes 19 are mounted on the flanges 17a, 17b through rivets 20, screws, or bolts, for instance. The rolling bodies 18 are mounted on the shafts 19 through rolling bearings, such as needle bearings 21, for instance.

The torque converter further comprises two opposed elastic leaves 22, consisting of three stacked blades 23a, 23b, 23c. As can be best seen in FIGS. 3 to 5, each blade 23a, 23b, 23c is symmetrical with respect to the X axis, with only one half of the blades being shown in the figures.

Figure 3:
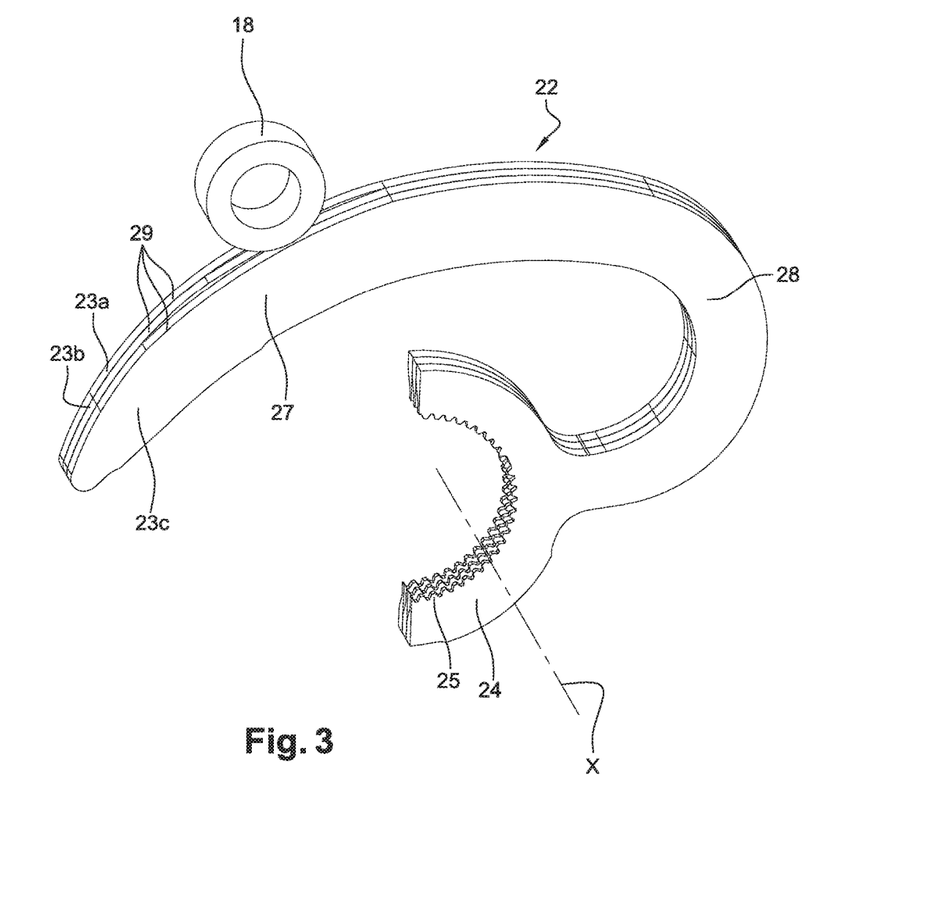
FIG. 3 is a perspective view of a part of a leaf and a supporting member, according to a first embodiment of the invention.
Figure 4:
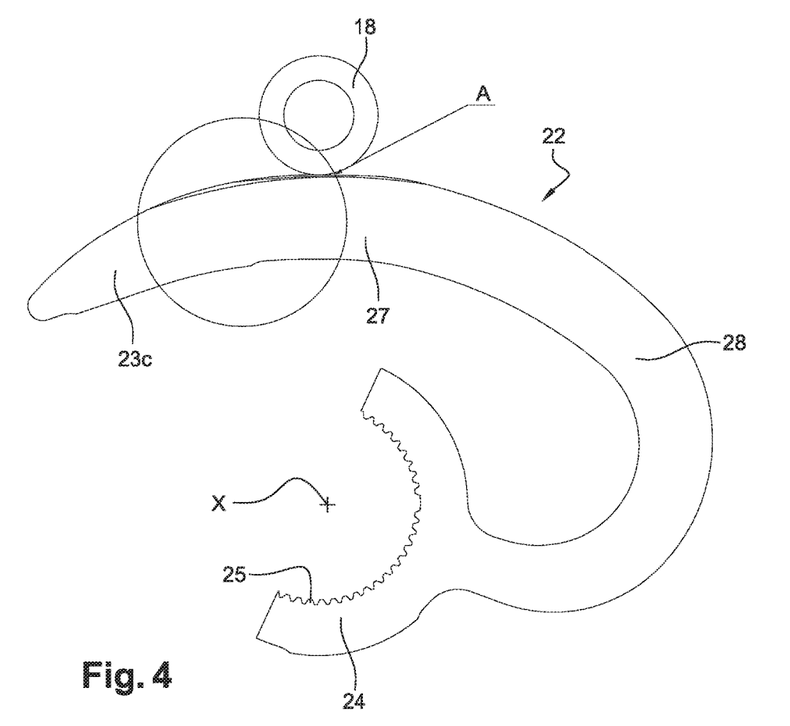
FIG. 4 is a front view of the elements shown in FIG. 3.
Figure 5:
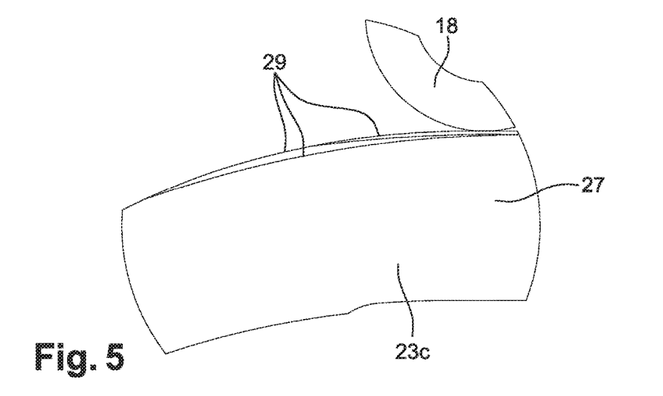
FIG. 5 is a view of detail A in FIG. 4.

Each blade 23a, 23b, 23c comprises a radially internal annular linking area 24, which comprises radially internal ribs or teeth 25 and cooperating with radially external ribs 26 of the hub 8 so as to rotationally couple said hub 8 and said blades 23a, 23b, 23c. Each blade further comprises two radially external and diametrically opposed strands 27 (only one strand 27 is shown in the figures), forming the leaves 22, each one being linked to the linking area 24 by a curved or bent area 28. Each external strand 27 and each curved area 28 are elastically deformable . The curved area 28 has an angle of approximately 180°.

Each external strand 27 develops on the circumference with an angle ranging from 120° to 180°. The radially external strand 27 comprises a radially external surface 29 which forms a raceway supported by the corresponding rolling body 18, with said rolling body 18 being positioned radially outside the external strands 29 of the elastic blades 23a, 23b, 23c. Each raceway 29 has a globally convex shape. The raceway 29 may directly consist of a zone of the external strand 27 or of a part which is added onto said external strand 27.

The raceways 29 of the three elastic blades 23a, 23b, 23c are partially shifted with respect to one another, as best shown in FIG. 5, so that said rolling body 18 is able to rest on only one of said three blades 23a, 23b, 23c during a first predetermined angular travel (about the X axis) of the rolling body 18 with respect to the blades, with said rolling body 18 being able to simultaneously rest on only two blades 23a, 23b, 23c during a second predetermined angular travel of the rolling body 18 with respect to the blades 23a, 23b, 23c, with said rolling body 18 being able to simultaneously rest on three blades 23a, 23b, 23c during a third predetermined angular travel of the rolling body 18 with respect to the blades 23a, 23b, 23c.

Between each elastic leaf 23a, 23b, 23c and the matching rolling body 18, the transmitted torque is broken down into radial stresses and peripheral stresses. Radial stresses make it possible for the matching blade 23a, 23b, 23c to bend and peripheral stresses make it possible for the matching rolling body 18 to move on the raceway 29 of the blade and to transmit the torque.

The torque converter further comprises clutch means 10 adapted to rotationally couple the cover 11 and the flanges 17a, 17b, in an engaged position, and adapted to release the cover 11 and the flanges 17a, 17b, in a disengaged position.

The clutch means 10 comprise an annular piston 30 which extends radially and is accommodated in the inner space 12 of the cover 11, the radially external periphery of which comprises a resting area equipped with clutch lining 31 and adapted to rest on the part 11c of the cover 11 in an engaged position, so as to provide a rotational coupling of the cover 11 and the piston 30.

The radially external periphery of the piston 30 further comprises at least one axially extending coupling lug 32 engaged into a notch or a recess having a shape matching that of the flanges 17a, 17b, so as to rotationally couple the piston 30 and the flanges 17a, 17b while allowing an axial motion of the piston 30 with respect to the flanges 17a, 17b.

The radially internal periphery of the piston 30 comprises a cylindrical rim 33 accommodated in the annular groove 15 of the hub and rotationally guided about the radially internal cylindrical surface of said groove 15.

The axial motion of the piston 25 is controlled by pressure chambers positioned on either side of the piston 25.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 30, the torque goes through the hydrokinetic coupling means, i.e. the impeller wheel 3 and then the turbine wheel 4 fixed to the hub 8. The torque is thus transmitted to the transmission input shaft 2 coupled to the hub through the internal ribs of the hub 8.

In the engaged position of the piston 30, the torque from the cover 11 is transmitted to the flanges 17 through the damping means formed by the elastic leaves 22 and by the supporting members 18. The torque is then transmitted to the internal hub 8 coupled to the blades 23a, 23b, 23c, then to the transmission input shaft 2 coupled to the hub 8 through the internal ribs of said hub 8.

In the engaged position of the piston 30, when the torque transmitted between the cover 11 and the hub 8 varies, the radial stresses exerted between each elastic leaf 22 and the matching rolling body 18 vary and the bending of the elastic leaf 22 is modified. The modification in the bending of the leaf 22 comes with a motion of the rolling body 18 along the matching raceways 29 due to peripheral stresses.

The raceways 29 have profiles so arranged that, when the transmitted torque increases, the rolling bodies 18 each exert a bending stress on the matching elastic blades 23a, 23b, 23c, which causes the free distal end of the elastic blades 23a, 23b, 23c, to move towards the X axis and a relative rotation between the cover 11 and the hub 8 such that the later move away from their relative rest positions. Rest position means the relative position of the flange 11 relative to the hub 8, wherein no torque is transmitted between the latter.

The profiles of the raceways 29 are thus such that the rolling bodies 18 exert bending stresses having radial components and circumferential components onto the elastic leaves 22.

The elastic leaves 22 exert, onto the rolling bodies 18, a back moving force having a circumferential component which tends to rotate the rolling bodies 18 in a reverse direction of rotation and thus to move back the turbine wheel 4 and the hub 8 towards their relative rest positions, and a radial component directed outwards which tends to maintain the raceways 29 supported by the matching rolling body 18.

The exerted stresses vary according to the number of blades 23a, 23b, 23c supported by the rolling bodies 18, i.e. according to the angular position around the X axis, of said blades 23a, 23b, 23c with respect to the axes 19, as mentioned above.

When the cover 11 and the hub 8 are in their rest positions, the elastic leaf 22 is preferably radially pre-stressed toward the X axis so as to exert a reaction force directed radially outwards, so as to maintain at least one blade 23a, 23b, 23c supported by the matching rolling body 18.

The profiles of the raceways 29 may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 22 are regularly distributed around the X axis and are symmetrical relative to the X axis so as to ensure the balance of the torque converter.

The torque converter may also comprise friction means so arranged as to exert a resisting torque between the cover 11 and the hub 8 during the relative displacement thereof so as to dissipate the energy stored in the elastic leaves 22.

Figure 6:
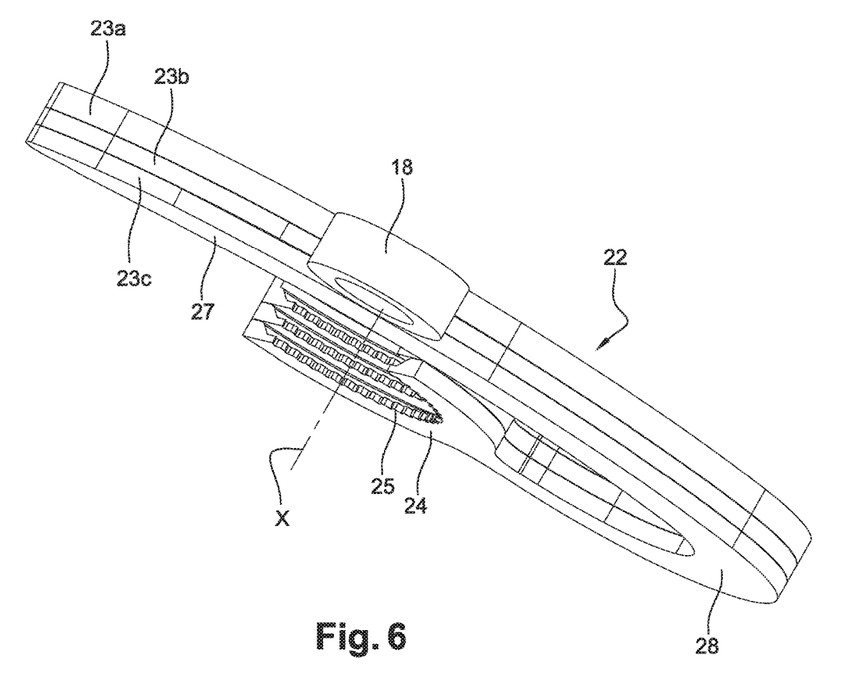
FIG. 6 is a perspective view illustrating a second embodiment of the invention.

As illustrated in FIG. 6, the blades 23a, 23b, 23c may have a different axial thickness (i.e. an axial dimension). In the case illustrated in FIG. 6, the blade 23a has a greater axial thickness than the other blades 23b, 23c so that the blade 23a has a higher stiffness constant than the other blades 23b, 23c, with said blades 23a, 23b, 23c being, for instance, made of the same material.

Figure 7:
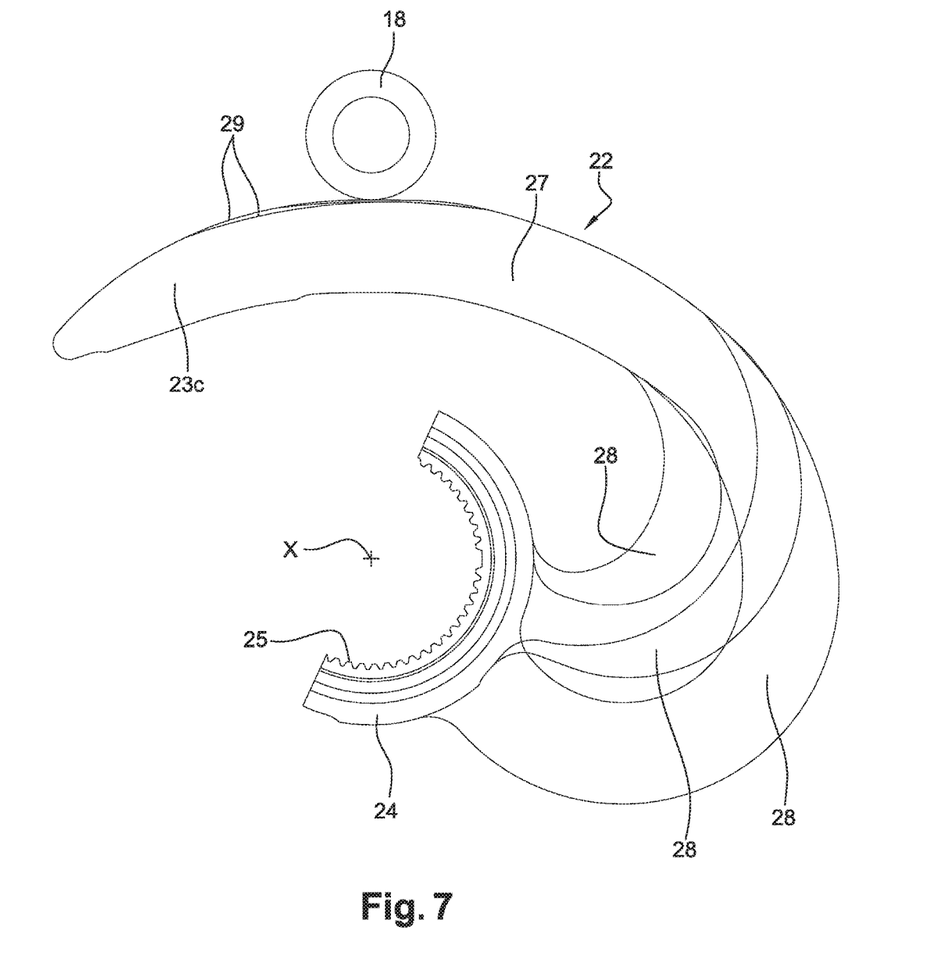
FIG. 7 is a view corresponding to FIG. 4, illustrating a third embodiment of the invention.
Figure 8:
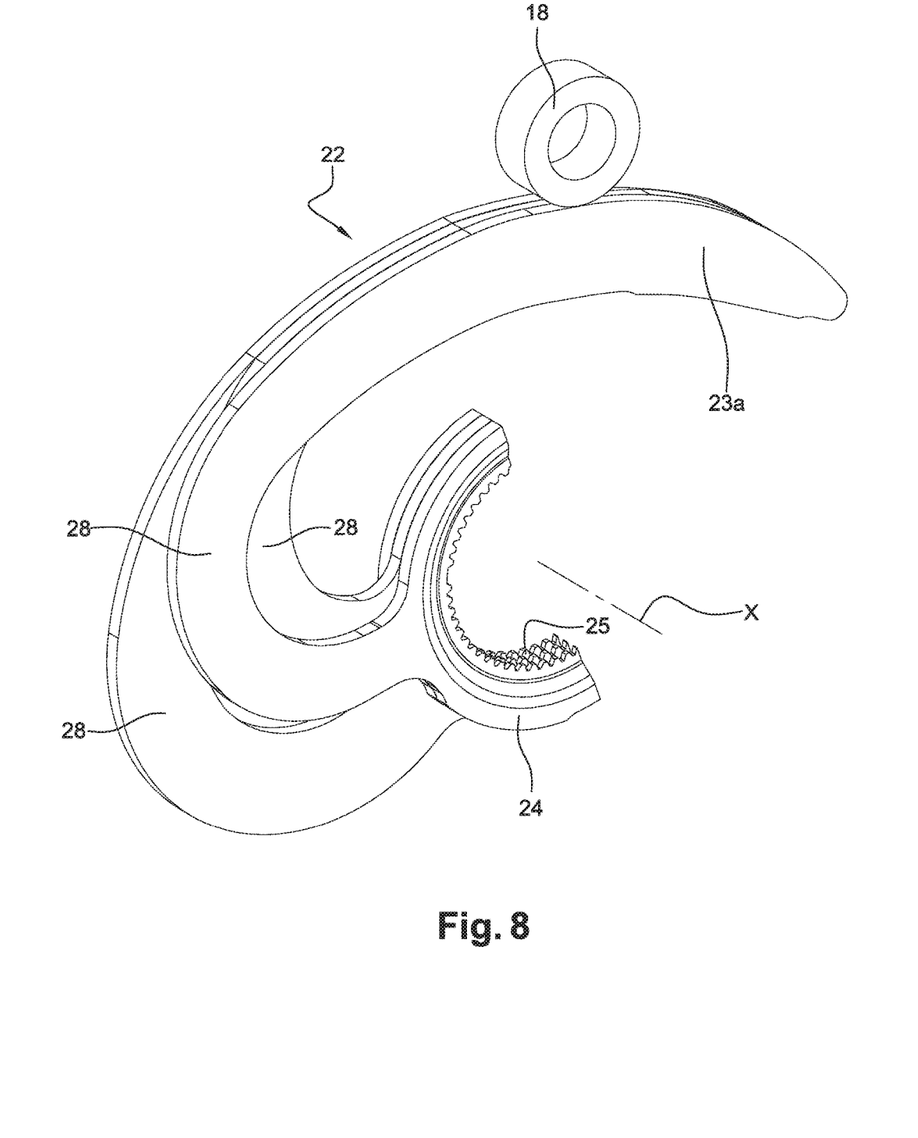
FIG. 8 is a perspective view illustrating the third embodiment of the invention.

Besides, as illustrated in FIGS. 7 and 8, the curved areas 28 of the various blades 23a, 23b, 23c of the same elastic leaf 22 may have different shapes or different radiuses of curvature, so that such curved areas 28 are, at least partially, shifted with respect to one another on a circumference. The blades 23a, 23b, 23c can thus have a different stiffness.

Figure 9:
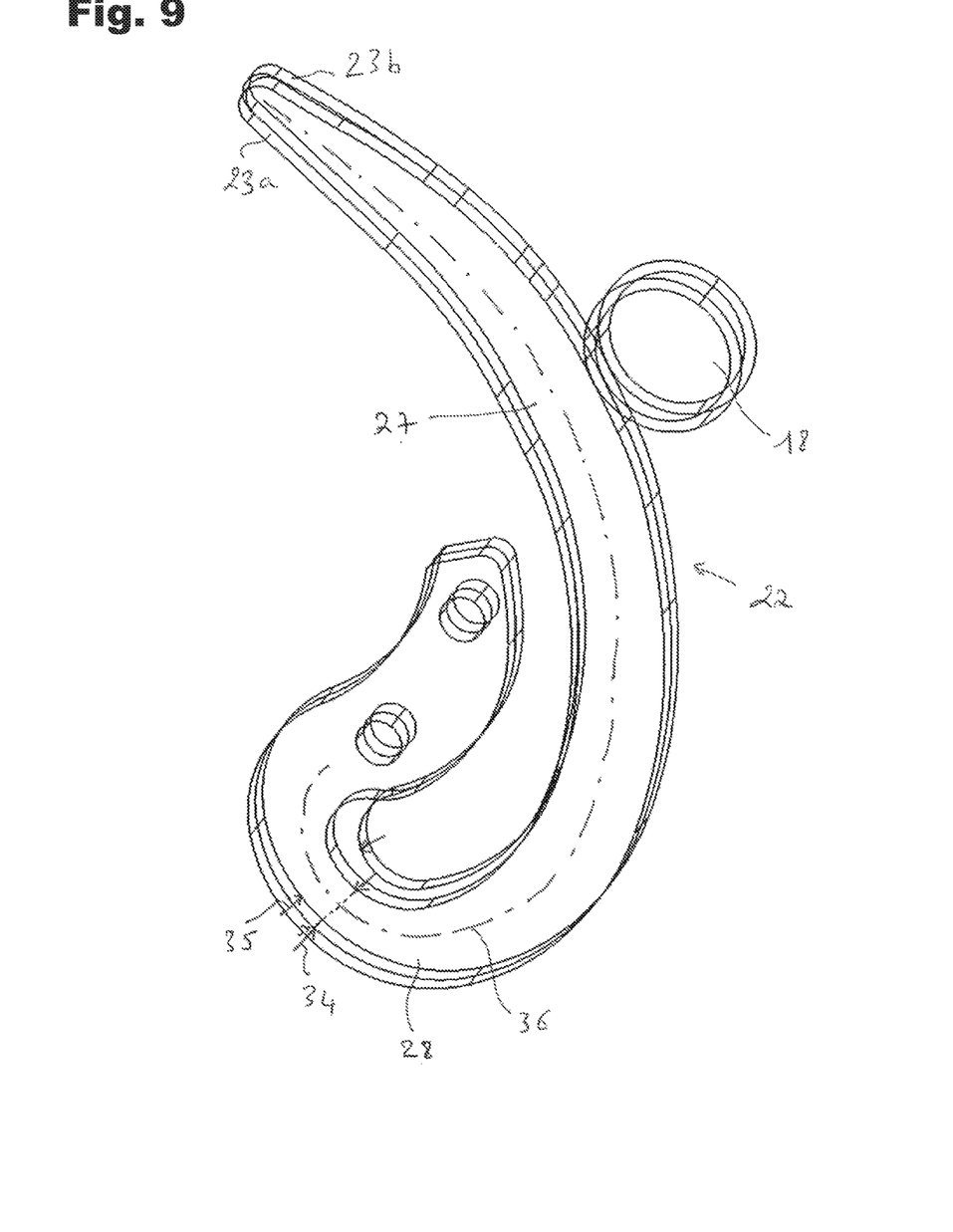
FIG. 9 is a perspective view illustrating a fourth embodiment of the invention.
Figure 10:
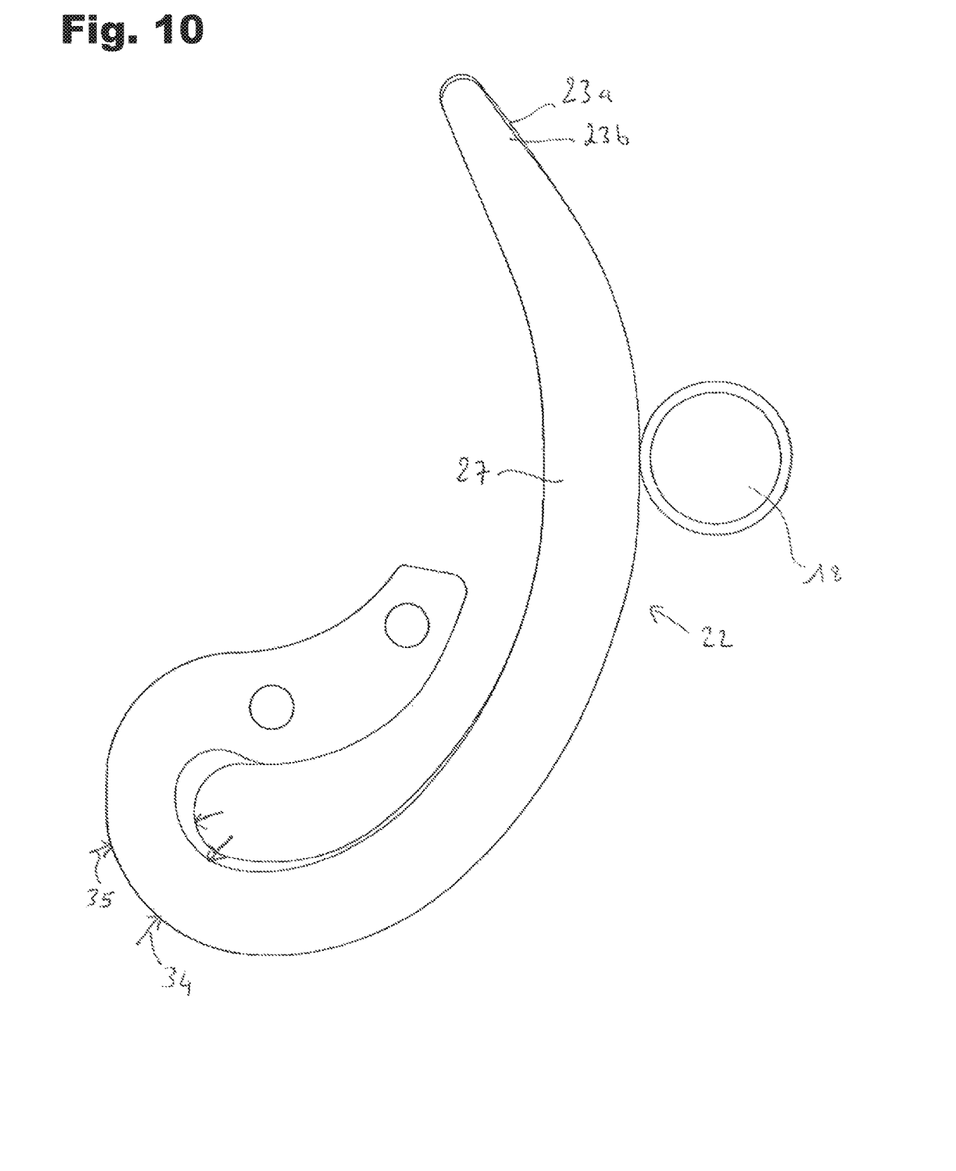
FIG. 10 is a front view of the elements illustrated in FIG. 9.

In another example of the invention, the blades may have a different stiffness, also because of their width 34, 35 which may vary from one blade to another, in FIGS. 8 and 9. FIGS. 8 and 9 illustrate a leaf comprising two blades 23a and 23b. Each blade has a width (i.e. a dimension measured along a line perpendicular to an expansion line of the blade, as shown in FIGS. 9 and 10) 34, 35 different from that of another one. The width 34 of the blade 23a is smaller than the width 35 of the blade 23b. The width 34, 35 of each blade 23a and 23b is measured on the blade along an axis (illustrated in doted lines) which is perpendicular to an expansion line 36 of the blade. Each blade has a distal end 37 and a proximal end 38, with the distal end 37 being distant from the linking area 24 unlike the proximal end 38. Each width 34, 35 is measured on the proximal end 38 of the blade, i.e. from a place close to the linking area 24.

In the example illustrated in FIGS. 8 and 9, the blade 23b has a width 35 larger than the width 234 of the blade 23a.

The invention claimed is:

1. A torque transmitting device, comprising:
a torque input element (17a, 17b) and a torque output element (8) configured to pivot about an axis (X) with respect to one another; and
at least two elastic leaves (22) rotationally coupled to the torque output element (8) or to the torque input element (17a, 17b), each of the at least two elastic leaves (22) configured to be elastically and radially held to rest on a supporting member (18) carried by the torque input element (17a, 17b) or the torque output element (8), each of the at least two elastic leaves (22) configured to bend upon rotation of the torque input element (17a, 17b) with respect to the torque output element (8);

each of the at least two elastic leaves (22) comprising at least two stacked elastic blades (23a, 23b, 23c), the at least two stacked elastic blades (23a, 23b, 23c) and the supporting member (18) configured so that the supporting member (18) is able to rest on only one of the at least two stacked elastic blades (23a, 23b, 23c) during a first predetermined angular travel of the torque input element (17a, 17b) with respect to the torque output element (8), the supporting member (18) configured to simultaneously rest on all of at least two stacked elastic blades (23a, 23b, 23c) during a second predetermined angular travel of the torque input element (17a, 17b) with respect to the torque output element (8).

2. The torque transmitting device according to claim 1, wherein each of the at least two elastic leaves (22) comprises three stacked elastic blades (23a, 23b, 23c), wherein the three stacked elastic blades (23a, 23b, 23c) and the supporting member (18) being so configured that the supporting member (18) is able to rest on only one of the three stacked elastic blades (23a, 23b, 23c) during the first predetermined angular travel of the torque input element (17a, 17b) with respect to the torque output element (8), wherein the supporting member (18) being able to simultaneously rest on only two of the three stacked elastic blades (23a, 23b, 23c) during the second predetermined angular travel of the torque input element (17a, 17b) with respect to the torque output element (8), and wherein the supporting member (18) being able to simultaneously rest on the three stacked elastic blades (23a, 23b, 23c) during a third predetermined angular travel of the torque input element (17a, 17b) with respect to the torque output element (8).

3. The torque transmitting device according to claim 1, wherein each of the at least two stacked elastic blades (23a, 23b, 23c) comprises a linking area (24) for connecting the connection the torque output element (8) to the torque input element (17a, 17b), and an external strand (27) having a radially external surface (29) for bearing on the supporting member (18), and wherein the radially external surface (29) of the external strand (27) of each of the at least two stacked elastic blades (23a, 23b, 23c) comprises at least a radially shifted portion with respect to the corresponding portion of the radially external surface (29) of the external strand (27) of the other of the at least two stacked elastic blades (23a, 23b, 23c).

4. The torque transmitting device according to claim 1, wherein one of the at least two stacked elastic blades (23a, 23b, 23c) has a stiffness that is different than the stiffness of another of the at least two stacked elastic blades (23a, 23b, 23c).

5. The torque transmitting device according to claim 3, wherein one of the at least two stacked elastic blades (23a) has an axial thickness, which is different from that of the other of the at least two stacked elastic blades (23b, 23c).

6. The torque transmitting device according to claim 3, wherein one of the at least two stacked elastic blades (23a) has a width, which is different from that of the other of the at least two stacked elastic blades (23b).

7. The torque transmitting device according to claim 4, wherein each of the at least two stacked elastic blades (23a, 23b, 23c) comprises a linking area (24) for connecting the torque output element (8) with the torque input element (17a, 17b), and an external strand (27) having a radially external surface (29) for bearing on the supporting member (18), wherein the linking area (24) and the radially external surface (29) of the external strand (27) being linked together by a curved area (28), and wherein the curved area (28) of one of the at least two stacked elastic blades (23a, 23b, 23c) has a radius of curvature different than the radius of curvature of another of the at least two stacked elastic blades (23a, 23b, 23c).

8. The torque transmitting device according to claim 1, wherein the supporting member (18) comprises a rolling body (18) mounted to pivot about a shaft (19), and wherein the shaft (19) being fastened to the torque input element (17a, 17b) with respect to the torque output element (8).

9. The torque transmitting device according to claim 8, wherein the rolling body of the supporting member (18) consists of a roller mounted so as to pivot about the shaft (19).

10. The torque transmitting device according to claim 1, wherein each of the at least two elastic leaves (22) is configured so that, in a relative angular position between the torque input element (17a, 17b) and the torque output element (8) different from a relative rest position, the supporting member (18) exerts a bending stress on one of the at least two elastic leaves (22) causing a cross reaction force of one of the at least two elastic leaves (22) on the supporting member (18), and wherein the cross reaction force has a circumferential component which tends to move back the torque input element (17a, 17b) and the torque output element (8) toward the relative rest position.

11. The torque transmitting device according to claim 1, wherein each of the at least two elastic leaves (22) is so designed that, in a relative angular position between the torque input element (17a, 17b) and the torque output element (8) different from a relative rest position, the supporting member (18) exerts a bending stress on one of the at least two elastic leaves (22) causing a cross reaction force of one of the at least two elastic leaves (22) on the supporting member (18), and wherein the cross reaction force has a radial component which tends to maintain one of the at least two elastic leaves (22) in contact with the supporting member (18).

12. The torque transmitting device according to claim 1, wherein an angular displacement of the torque input element (17a, 17b) relative to the torque output element (8) is greater than 20°.

13. The torque transmitting device according to claim 1, further comprising damping means comprising the at least two elastic leaves (22), wherein each of the at least two elastic leaves (12) rotates together with the torque output element (8) or the torque input element (17a, 17b), wherein each of the at least two elastic leaves (22) is associated with the supporting element (18) rotationally linked with the torque input element (17a, 17b) or the torque output element (8), wherein each of the at least two elastic leaves (22) is elastically maintained supported by the supporting element (18), and wherein each of the at least two elastic leaves (22) is configured to bend upon rotation of the torque input element (17a, 17b) relative to the torque output element (8).

14. A hydrokinetic torque coupling device for a motor vehicle, comprising:
 an impeller wheel (3) intended to be coupled to a crankshaft (1);
 a turbine wheel (4) hydrokinetically rotatable by the impeller wheel (3) and configured to be rotationally coupled to a transmission input shaft (2);
 clutch means (10, 30);
 the torque transmitting device according to claim 1, wherein the torque input element (17a, 17b) being linked to or including the clutch means (10), and wherein the torque input element being linked to or including a hub (8) intended to be rotationally coupled to the transmission input shaft (2);

the clutch means (10, 30) being movable between an engaged position in which the impeller wheel (3) and the torque input element (17*a*, 17*b*) of the torque transmitting device are non-rotatably coupled, and a disengaged position in which the impeller wheel (3) and the torque input element (17*a*, 17*b*) are rotationally uncoupled.

15. The hydrokinetic torque coupling device according to claim 14, wherein the hub (8) is non-rotatably coupled to the turbine wheel (4).

16. The hydrokinetic torque coupling device according to claim 14, wherein the clutch means (10) comprise a piston (30).

17. The torque transmitting device according to claim 2, wherein each of the three stacked elastic blades (23*a*, 23*b*, 23*c*) comprises a linking area (24) for connecting the torque output element (8) to the torque input element (17*a*, 17*b*), and an external strand (27) having a radially external surface (29) for bearing on the supporting member (18), and wherein the radially external surface (29) of the external strand (27) of each of the at least two stacked elastic blades (23*a*, 23*b*, 23*c*) comprises at least a radially shifted portion with respect to the corresponding portion of the radially external surface (29) of the external strand (27) of the other of the at least two stacked elastic blades (23*a*, 23*b*, 23*c*).

18. The torque transmitting device according to claim 2, wherein one of the three stacked elastic blades (23*a*, 23*b*, 23*c*) has a stiffness that is different than the stiffness of other of the three stacked elastic blades (23*a*, 23*b*, 23*c*).

19. The torque transmitting device according to claim 3, wherein one of the at least two stacked elastic blades (23*a*, 23*b*, 23*c*) has a stiffness that is different than the stiffness of another of the at least two stacked elastic blades (23*a*, 23*b*, 23*c*).

20. The torque transmitting device according to claim 5, wherein one of the at least two stacked elastic blades (23*a*) has a width, which is different from that of the other of the at least two stacked elastic blades.

* * * * *